C. A. HEALEY.
TOOTH FOR HAY RAKES.
APPLICATION FILED JUNE 8, 1917.
1,258,770.
Patented Mar. 12, 1918.
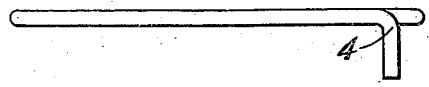
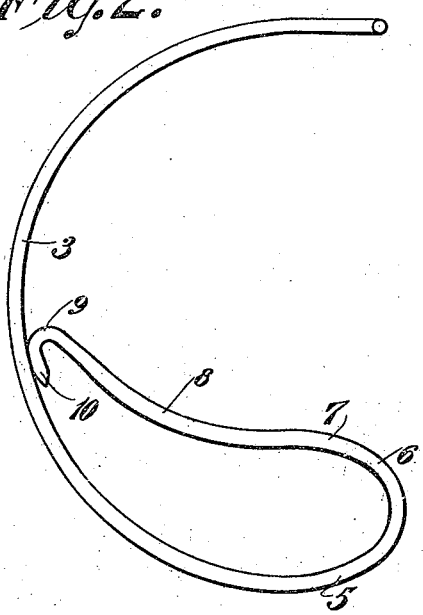
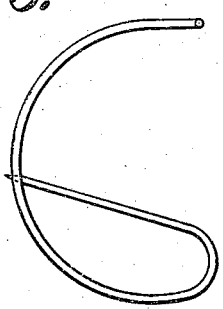
WITNESS:
INVENTOR,
C. A. Healey,
BY
ATTORNEY.

UNITED STATES PATENT OFFICE.

CLINTON A. HEALEY, OF WESTFIELD, MASSACHUSETTS.

TOOTH FOR HAY-RAKES.

1,258,770.  Specification of Letters Patent.  Patented Mar. 12, 1918.

Application filed June 8, 1917. Serial No. 173,618.

*To all whom it may concern:*

Be it known that I, CLINTON A. HEALEY, a citizen of the United States of America, and resident of Westfield, in the county of Hampden and State of Massachusetts, have invented certain new and useful Improvements in Teeth for Hay-Rakes, of which the following is a full, clear, and exact description.

This invention relates to hay rakes of the usual or conventional form having a curved tooth with a pointed end; and the object of the invention is to provide a special form of tooth to be employed at each end instead of the pointed rake tooth, whereby the rake tooth, instead of having a forwardly projecting pointed extremity, has the bar on which the tooth is made extended considerably beyond the normal length, and then doubled back in the general line of the tooth, and in the same plane, with the end portion given a special bend to strengthen the member and prevent its interfering with the desired function of the member as a guard.

In the accompanying drawings showing one embodiment of my invention,

Figure 1 is a plan view of the tooth, and

Fig. 2 is a side elevation of the same.

Fig. 3 shows a modification.

In the preferred form set forth herein the rod or bar 3 is given the usual arc shape or semi-circular formation, from the bent arm at the upper extremity 4, to a place 5 that is the ordinary location of the pointed extremity of the tooth member. But instead of terminating at this place, the rod 3 is of considerably greater length, and it is bent backwardly in a substantially semi-circular curve 6 as shown, and in the same plane as the main portion 3 of the tooth.

From the inner end of the semi-circular curve 6, the extension is given a curve of large radius 8, but in the opposite direction, so that it extends in the general line of curvature of the body portion 3 as shown.

The end portion of the extension is given an abrupt bend at 9, in the same plane as the body portion 3, whereby the extremity 10, that is usually pointed, is caused to extend backward or downward as shown and lies substantially parallel with the body portion 3, in close proximity or in contact with the same.

By this construction the formation of the open loop of somewhat elliptical shape in general contour is provided by merely having the tooth member of a greater length than the ordinary tooth and causing the extension to be given this special configuration.

By this construction a guard is provided that will efficiently serve to prevent the hay or grass from moving outwardly away from the rake and being scattered.

Obviously, such an article is of the greatest economy in construction and formation and can be readily attached to any of the hay rakes in use.

The attaching end 4, of course, can be constructed as may be needed for attachment to the hay rake.

By reason of the converging shape of the opening of the guard portion, the hay will crowd in the loop and be held to prevent rolling of the accumulated hay. The extremity of the guard is not secured to the body portion, but retained under a firm pressure, which can yield on occasion to release any object that might become lodged therein.

In Fig. 3 I show a slightly modified form in which the end of the extension extends across the body instead of being bent back. The same general form of elongated loop is provided to prevent the rolling of the head.

In the construction shown in Fig. 3, the main body portion is curved to form a C-shaped portion and the lower end portion is bent inwardly to engage the side of said C-shaped portion, whereby a normally closed spring loop is formed. The hay may pack in this loop and the terminal of said bent end portion, which constitutes a guard arm, has a yielding bearing against the side of the C-shaped portion. Said terminal and guard arm will yield upward and laterally in one direction, that is away from the C-shaped portion or main body of the tooth. By this arrangement a boulder which would become wedged in the spring loop, would soon be displaced by the pressure of the hay thereagainst; the guard arm resuming its normal position when the boulder has been dislodged.

Having thus described my invention, what I claim is:—

An end tooth for hay rakes consisting of a single piece of wire having its main body curved and one end portion of said body deflected toward the middle and forward concave portion of said curved main body, the terminal portion of said deflected end portion having yielding engagement with the said curved main body portion and providing with said curved main body portion a normally closed spring loop in which hay may be accumulated.

Signed by me at Springfield, Mass., in presence of a subscribing witness.

CLINTON A. HEALEY.

Witness:
G. R. DRISCOLL.

Copies of this patent may be obtained for five cents each, by addressing the "Commissioner of Patents, Washington, D. C."